United States Patent
Jacobowitz et al.

(10) Patent No.: US 7,391,572 B2
(45) Date of Patent: Jun. 24, 2008

(54) HYBRID OPTICAL/ELECTRONIC STRUCTURES FABRICATED BY A COMMON MOLDING PROCESS

(75) Inventors: Lawrence Jacobowitz, Wappingers Falls, NY (US); Casimer DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 11/365,011

(22) Filed: Mar. 1, 2006

(65) Prior Publication Data

US 2007/0206288 A1 Sep. 6, 2007

(51) Int. Cl.
*G02B 27/10* (2006.01)
*B29D 11/00* (2006.01)

(52) U.S. Cl. .................... 359/619; 264/1.7; 264/2.4; 264/328.13

(58) Field of Classification Search ............ 359/619, 359/620, 626, 456, 796, 808, 809, 665, 819; 430/320–322, 397, 945, 966; 264/1.1, 1.2, 264/1.7, 2.4, 2.5, 40.5, 219, 328.13, 328.16, 264/500; 216/8, 9, 24, 39, 49; 385/18, 119; 205/70; 438/60, 70; 425/149, 150, 542
See application file for complete search history.

(56) References Cited

U.S. PATENT DOCUMENTS

| | | | | |
|---|---|---|---|---|
| 4,284,591 A * | 8/1981 | Neefe | ............ | 264/1.1 |
| 6,558,878 B1 * | 5/2003 | Park et al. | ............ | 430/321 |
| 6,825,995 B2 * | 11/2004 | Yamada et al. | ............ | 359/796 |
| 6,972,912 B2 * | 12/2005 | Yamada et al. | ............ | 359/796 |
| 6,985,310 B2 * | 1/2006 | Yamada et al. | ............ | 359/796 |
| 6,992,842 B2 * | 1/2006 | Yamada et al. | ............ | 359/796 |
| 6,994,951 B1 * | 2/2006 | Chen et al. | ............ | 430/320 |
| 7,295,375 B2 * | 11/2007 | Jacobowitz et al. | ............ | 359/619 |
| 2005/0067286 A1 * | 3/2005 | Ahn et al. | ............ | 205/70 |

* cited by examiner

*Primary Examiner*—Loha Ben
(74) *Attorney, Agent, or Firm*—Scully, Scott, Murphy & Presser, P.C.; Robert M. Trepp, Esq.

(57) ABSTRACT

Disclosed is a method of fabricating a molded structure including both micro lenses and metallic pins. The method comprises the steps of providing a mold apparatus having a set of first cavities and a set of second cavities, depositing a first material in the first cavities to form a set of metallic pins, and depositing a second material in the second cavities to form a set of micro lenses. The formed molded structure comprises a substrate, a set of molded microlenses on said substrate, and a set of molded metallic pins on that same substrate. The metallic pins may be formed as alignment pins or as electrical connectors. The invention enables the micro lenses and metallic pins to be manufactured by way of molding on a common substrate for the first time.

7 Claims, 6 Drawing Sheets

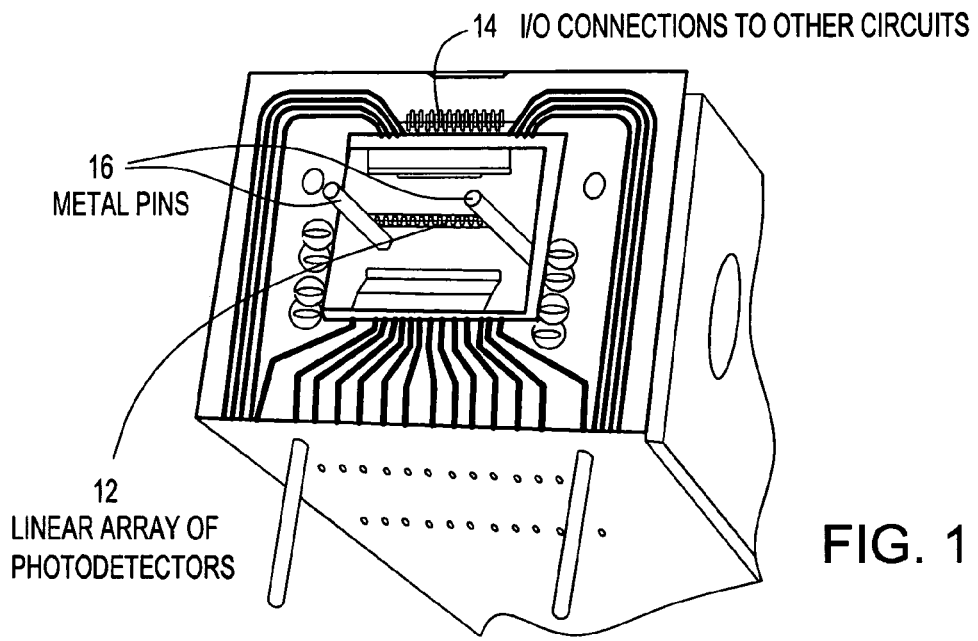
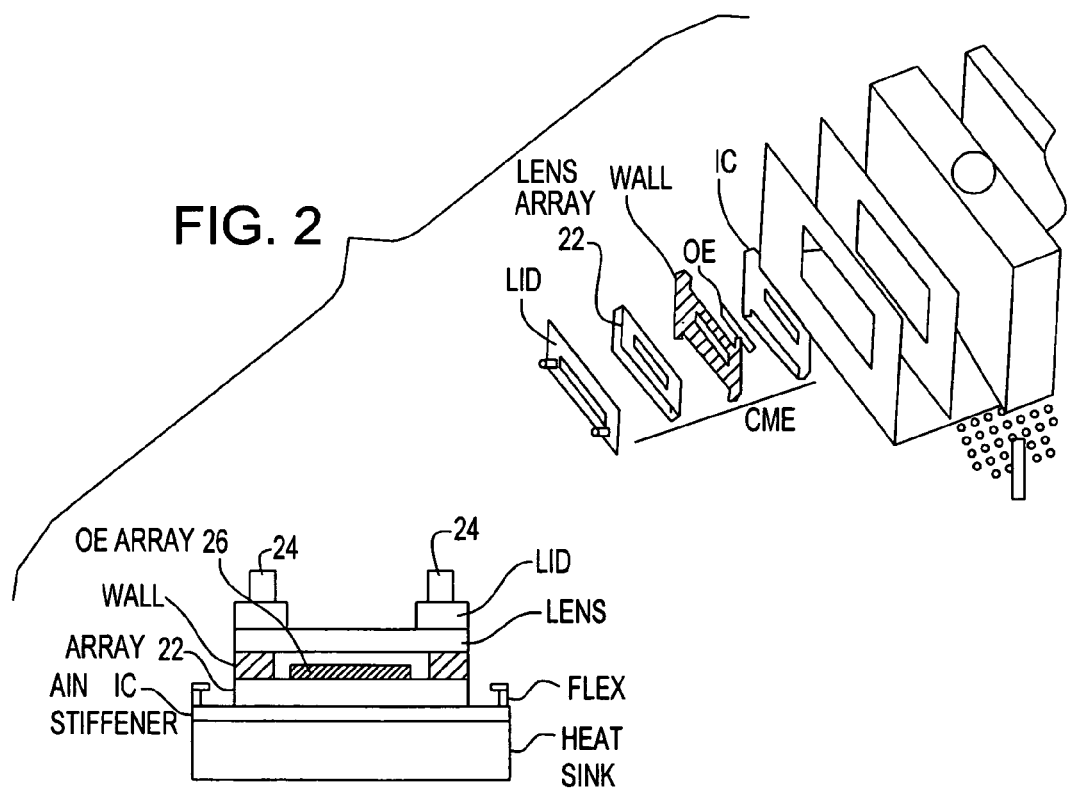

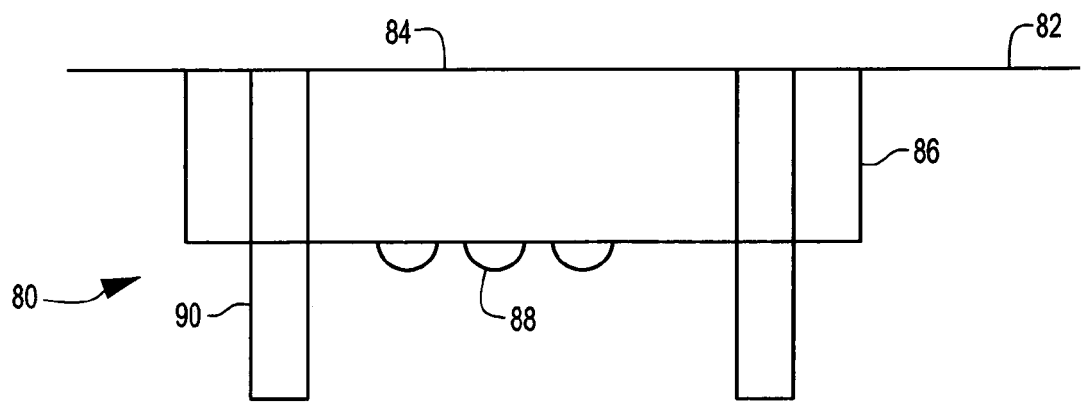
FIG. 8
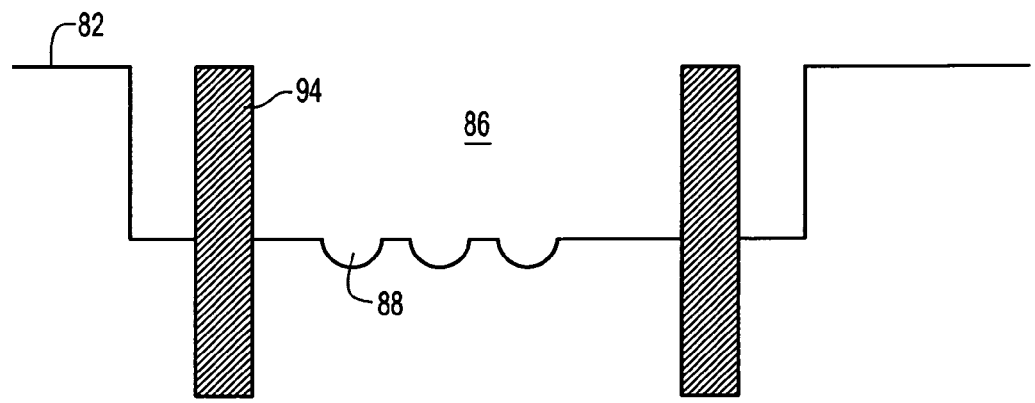
FIG. 9

HYBRID OPTICAL/ELECTRONIC STRUCTURES FABRICATED BY A COMMON MOLDING PROCESS

CROSS-REFERENCE TO RELATED APPLICATIONS

This application is related to the following co-pending applications, each of which is assigned to the same assignee as this application, International Business Machines Corporation of Armonk, N.Y. Each of the below listed applications is hereby incorporated herein by reference in its entirety:

application Ser. No. 11/195,147, filed Aug. 2, 2005, for "Injection Molded MicroOptics," and application Ser. No. 11/195,150, filed Aug. 2, 2005, for "Injection Molded Microlenses For Optical Interconnects, now U.S. Pat. No. 7,295,375."

BACKGROUND OF THE INVENTION

1. Field of the Invention

This invention generally relates to the fabrication of micro lens elements. More specifically, the invention relates to apparatus and methods for fabrication of micro lens elements and metal features, such as guide pins or electrical connectors, in a single molding process. The invention allows the optical micro lens and metallic connector elements to be manufactured on a common substrate for the first time.

2. Background Art

For parallel optic applications, lens components are used to facilitate coupling light into a detector array. In order to achieve low cost, molded plastic optics has been used for fiber-to-detector coupling. Two basic types, thermoplastic and thermoset materials, have been employed in industry-standard multi-fiber push-on (MPO) connectors and in the multi-fiber termination (MT) ferrules which form the basis of these connector systems.

The industry standard for parallel optical interconnects is based on the MPO connector, as standardized by the Telecommunications Industry of America (TIA). This connector achieves optical alignment by using a pair of high precision metal guide pins to interface with a corresponding set of precision holes fabricated in the optical receptacle, as shown in FIGS. 1, 2 and 3. In particular, FIG. 1 illustrates an example of a conventional photodetector array 12 with an MPO optical fiber array interface 14 using precision metal guide pins 16. FIG. 2 shows an example of a conventional lens array 22 and guide pin assembly 24 for photodetector arrays with an MPO optical interface 26 (both schematic and side views), and FIG. 3 illustrates a conventional manually positioned micro lens array 32 within an MPO optical connector 34.

Current designs fabricate the MPO connector interface and coupling lenses as separate processes and manually assemble them into a finished product; this requires active alignment (often an expensive, manual process) and cannot fully take advantage of the precision alignment designed into the MPO interface.

SUMMARY OF THE INVENTION

An object of this invention is to improve the fabrication of micro lens elements.

Another object of the present invention is to fabricate both micro lenses and metal pins in a single injection molding process.

A further object of the invention is to fabricate both the microlenses and precision alignment pins in a multi-fiber optical connector in a single process, using a common injection molding system.

Another object of this invention is to fabricate MPO compatible interfaces directly on silicon or other semiconductor chip substrates, making it possible to integrate photodetectors or other active devices with the MPO interface at a chip level.

An object of the invention is to manufacture optical and metallic connector elements on a common substrate and using a single injection molding system.

These and other objectives are attained with a method of fabricating a molded structure including both micro lenses and metallic pins. The method comprises the steps of providing a mold apparatus having a set of first cavities and a set of second cavities, depositing a first material in the first cavities to form a set of metallic pins, and depositing a second material in the second cavities to form a set of micro lenses. The formed molded structure comprises a substrate, a set of molded microlenses on said substrate, and a set of molded metallic pins on that same substrate. In one embodiment, the metallic pins are connector pins used to align the micro lenses in position when the structure is connected to another device, such as an optical connector. In a second embodiment, the metallic pins are electrical connectors that are used to electrically connect the molded structure to another device, such as a computer backplane.

The preferred embodiment of the invention, described below in detail, provides a glass micro lens array fabricated using wafer scale manufacturing approaches, because of its superior thermal performance and low manufacturing cost; however, plastic materials may be used as an alternate embodiment. To further reduce the assembly cost, a receptacle may be used that incorporates both an interface for MT array connector and an interface for micro-optics. To facilitate passive alignment between the lens array and fiber array receptacle, mechanical structures may be fabricated on one side of the lens array, which will mate with a precision molded cavity on the receptacle. Also, a release layer may be applied to conformally coat the sidewalls of the cavities in which the micro lenses are formed to help release those formed lenses from the cavities.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 illustrates an example of a conventional photodetector array with an MPO optical fiber array interface using precision metal guide pins.

FIG. 2 illustrates an example of a conventional lens array and guide pin assembly for photodetector arrays with an MPO optical interface (both schematic and side views).

FIG. 8 illustrates an alternate embodiment of the invention, in which the first process step involves assembly of a multi-cavity mold.

FIG. 9 illustrates the next step in an alternate embodiment, in which a first scan pass fills some of the cavities with metal and the mold insert is then removed.

DETAILED DESCRIPTION OF THE PREFERRED EMBODIMENTS

This invention relates to the fabrication of micro lenses, and more specifically, to micro lenses that are suited for use as optical connectors. As mentioned above, in order to achieve low cost, molded plastic optics has been used for fiber-to-detector coupling. Two basic types, thermoplastic and thermoset materials, have been employed in industry-standard multi-fiber push-on (MPO) connectors and in the multi-fiber termination (MT) ferrules which form the basis of these connector systems. As an alternative, glass materials are preferred since they are more stable over a wide temperature range and humidity environment than plastic. Additionally, glass materials provide more design freedom due to the availability of a wide variety of glasses with different types of doping, melting points, etc.

A preferred embodiment of the invention provides a glass micro lens array fabricated using wafer scale manufacturing approaches, because of its superior thermal performance and low manufacturing cost; however, plastic materials may be used as an alternate embodiment. To further reduce the assembly cost, a receptacle may be used that incorporates both an interface for MT fiber array connector and an interface for micro-optics. To facilitate passive alignment between the lens array and fiber array receptacle, mechanical structures may be fabricated on one side of the lens array, which will mate with a precision molded cavity on the receptacle.

Figure 3:
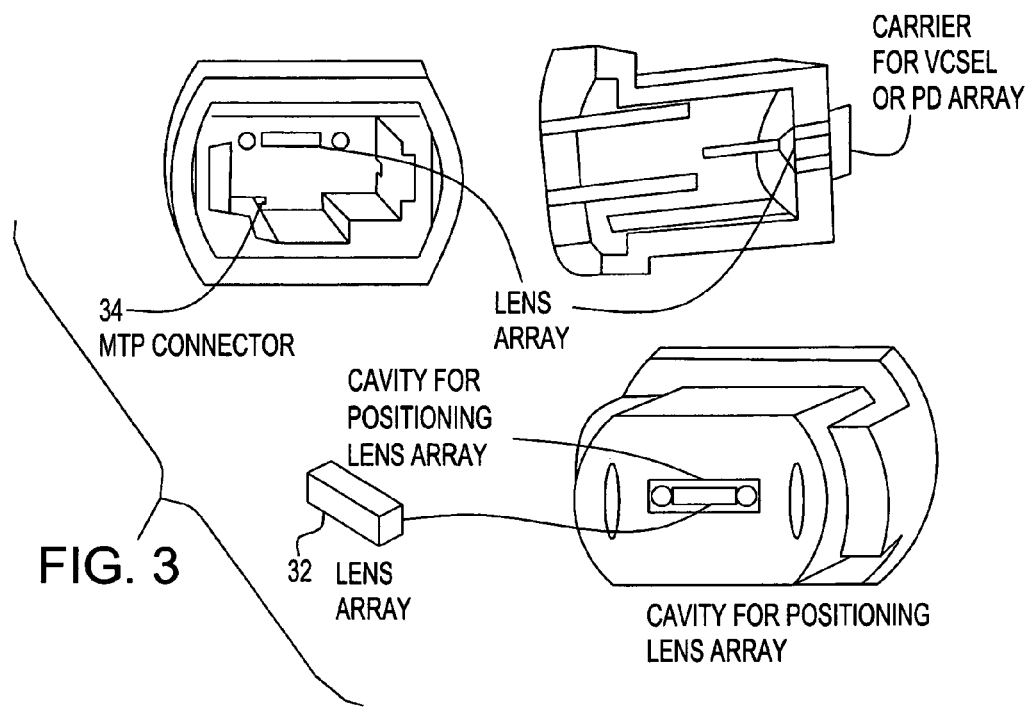
FIG. 3 shows a conventional manually positioned micro lens array within an MPO optical connector.

With reference again to FIGS. 1, 2 and 3, the MPO connector was designed for alignment of optical fiber arrays (from 1×12 linear fiber arrays up to 9×12 two-dimensional arrays), and the use of precision metal guide pins allows for relaxed tolerances and lower costs in other aspects of the connector design. The design specifications for compatibility with MPO connectors are quite strict; the guide pin and hole must have a diameter of 700.0 microns with a tolerance of 0.5 micron or less, and their separation must be 2.6000 mm with a tolerance of 0.45 micron. These figures should be considered representative examples only; future versions of this connector may have even tighter tolerance restrictions. These structures provide passive alignment of a fiber array connector in the lens plane.

The remaining dimension perpendicular to the array is controlled in conventional MPO designs through a combination of precision controlled fiber protrusion and polishing (typically 1.0 micron fiber stubs protrude from the connector surface with a uniformity of less than 0.2 micron) and active alignment with a lens array having a desired focal length. Controlling fiber protrusion to minimize air gaps at the interface is critical in minimizing attenuation and controlling problems caused by interferometric noise; because of the many difficulties associated with this approach, micro lens designs have been adopted which do not require high precision control of fiber protrusion. Conventional techniques bond a micro lens array to the interface with epoxy following active alignment to maximize coupled optical power; if the lens is often not centered on the detector array, optical power is lost. Furthermore, angular alignment with a detector array is critical; in order to couple at least 90% of the optical power, the angular tilt of the lens array must be less than 1 degree maximum, and preferably less than 0.5 degree.

Figure 4:
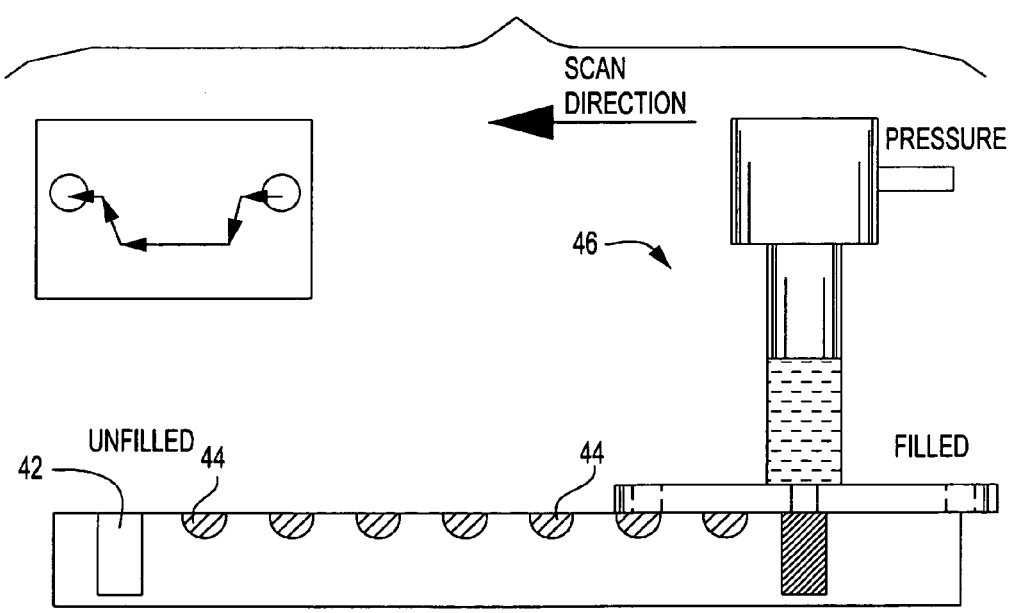
FIG. 4 illustrates the use of an injection molding apparatus with a mold plate containing different cavity shapes, showing the use of a nonlinear scan and potential use of a sacrificial covering for intermediate cavities.
Figure 5:
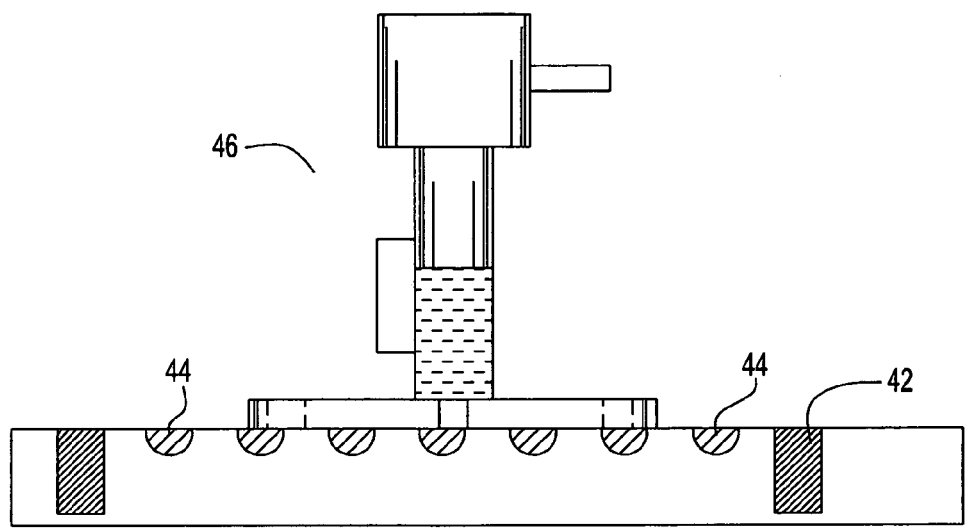
FIG. 5 shows the use of a second injection molding pass to fill cavities which were avoided during the previous scan.

With reference to FIGS. 4 and 5, the present invention provides a method for fabricating both the micro lenses and precision alignment pins using an injection molding system. This offers several advantages; first, since the process is compatible with both metal deposition and glass/polymer deposition, the pins and lenses may be manufactured on a common substrate for the first time. This avoids both the linear and angular misalignment concerns mentioned earlier, and facilitates passive alignment with a detector array. Second, this method allows fabrication of MPO compatible interfaces directly on silicon or other semiconductor chip substrates, making it possible to integrate photodetectors or other active devices with the MPO interface at a chip level, rather than using more cumbersome, expensive techniques to direct light into a fiber interface that may be located some distance away from the chip. Furthermore, the MPO design calls for precision metal pins, but recent environmental standards require lead-free metallics in all chip fabrication processes; this has been an inherent obstacle to the integration of MPO optical interfaces with semiconductor chips. However, the injection molding process enables the fabrication of metal pins with lead-free materials that still have sufficient tolerances to be compatible with an MPO interface.

The approach illustrated in FIGS. 4 and 5 is a multi-cavity approach, in which lead-free metallic pins are fabricated in cavities 42 via injection molding, adjacent to other cavities 44 which contain the micro lens material. Some cavities may have tighter tolerances than others, so that the micro lens fabrication does not have to meet the same specifications as the pin fabrication. It is preferable to deposit the material with the higher melting point first, then return to deposit the lower melting point material; for example, the metal pins likely have a higher melting point than a low temperature glass or optical polymer, so they would be deposited first. The first pass scan fills the deeper, precision dimensioned pin holes 42 with lead-free metal; the lens cavities are not filled (this may be done by either controlling the pressure on the fill mechanism 46 or covering the lens cavities 44 with a temporary, sacrificial cover which is later removed so that the lens can be fabricated).

Figure 6:
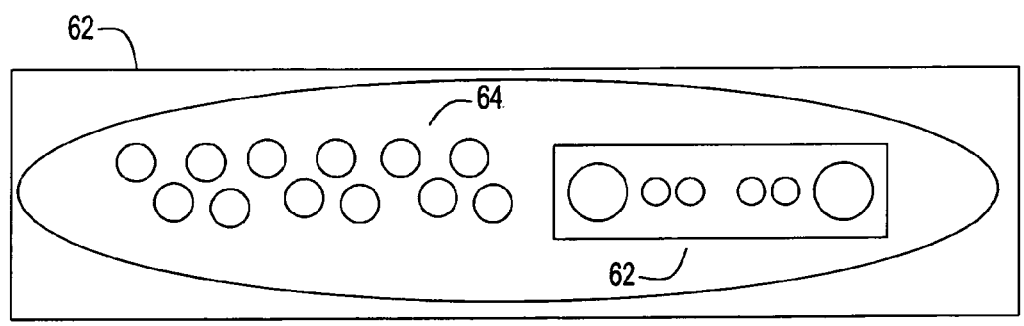
FIG. 6 shows a hybrid connector with both electrical and optical components which may be produced with this invention.

A second scan pass is used to fill only the lens holes 44 with molten glass or optical polymer at a lower temperature. This scan will either avoid the filled metal holes 42 altogether, or else the filled metal holes can be protected with a temporary cover while the second scan passes over them. Since the pins and lenses are fabricated on a common substrate, the relative alignment between them can be easily controlled using this method, virtually eliminating off-axis optical alignment that can cause loss of coupled optical power in the application. Also, depending on the material choice, the mold cavities 44 may first be coated with an optional release layer to facilitate de-molding of the microlenses formed in those cavities. Any suitable release layer may be used; and, for example, fluorocarbon coatings, such as polytetrafluoroethylene (PTFE), (and as a more specific example, a Teflon® coating) may be used. With reference to FIG. 6, this same method can be adopted for fabrication of hybrid optical and copper interfaces, which have applications in computer backplanes. In particular, FIG. 6 shows a hybrid optical/electrical connector 62, including a series of electrical pins 64 and a series of optical fibers 66.

Any suitable injection or fill mechanism, represented at 46, may be used to deposit the materials into the cavities 42 and 44, and any suitable control means or mechanism may be used to operate or control the injection mechanism. For example, fill mechanism 46 may be controlled to move along programmable non-linear scan paths during the injection molding to facilitate selective fill of different cavities with different materials.

Figure 7:
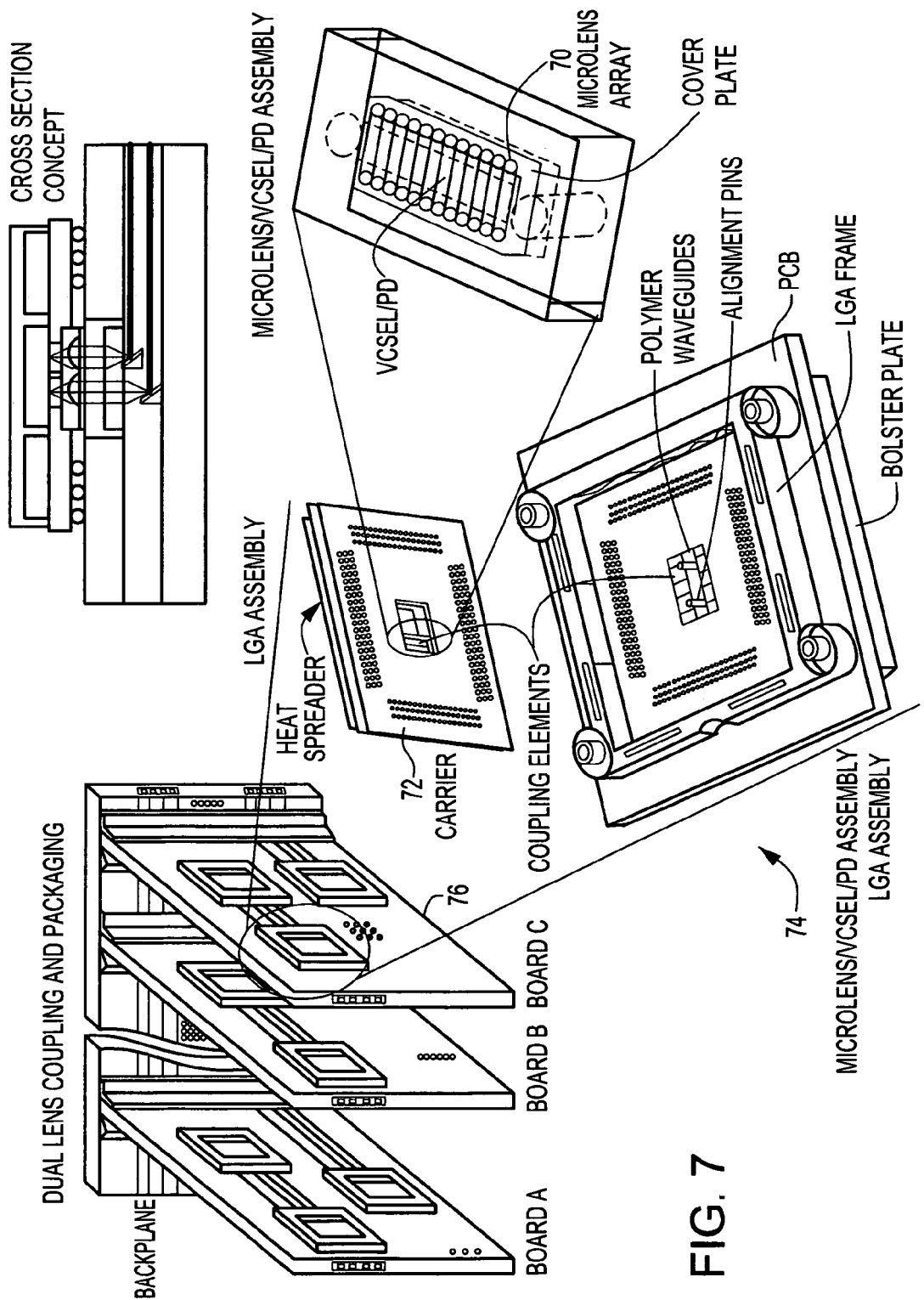
FIG. 7 illustrates how injection molded electrical and optical elements may be combined into a computer backplane application.

The final step is packaging of the micro lens and MPO assembly. One suitable packaging procedure is illustrated in FIG. 7, in which a micro lens array 70 is inserted into a carrier 72. This carrier is inserted into an LGA assembly 74 that, in turn, is inserted into a board 76, which is then connected to a computer backplane.

An important advantage of this invention is that the hybrid integrated assembly can be directly attached to chip substrates in a dual or multi-chip module package, enabling direct optical coupling between active devices on chip and optical fiber interconnects. This feature is illustrated in FIG. 7, for both vertical cavity surface emitting laser (VCSEL) and photodiode assemblies. The design illustrated in FIG. 7 shows a lower cost organic chip carrier as the substrate; note that the preferred design has two essential requirements, namely a set of turning mirrors and waveguides to deflect the optical signals and a set of dual lens elements to couple the light a greater distance from the carrier into or onto the printed circuit board. The preferred micro lens also increases the alignment tolerance to about 0.5 mil in each direction in the plane of the substrate, which allows for passive alignment; furthermore, it provides margin for temperature-induced dimensional changes in the substrate.

Figure 10:
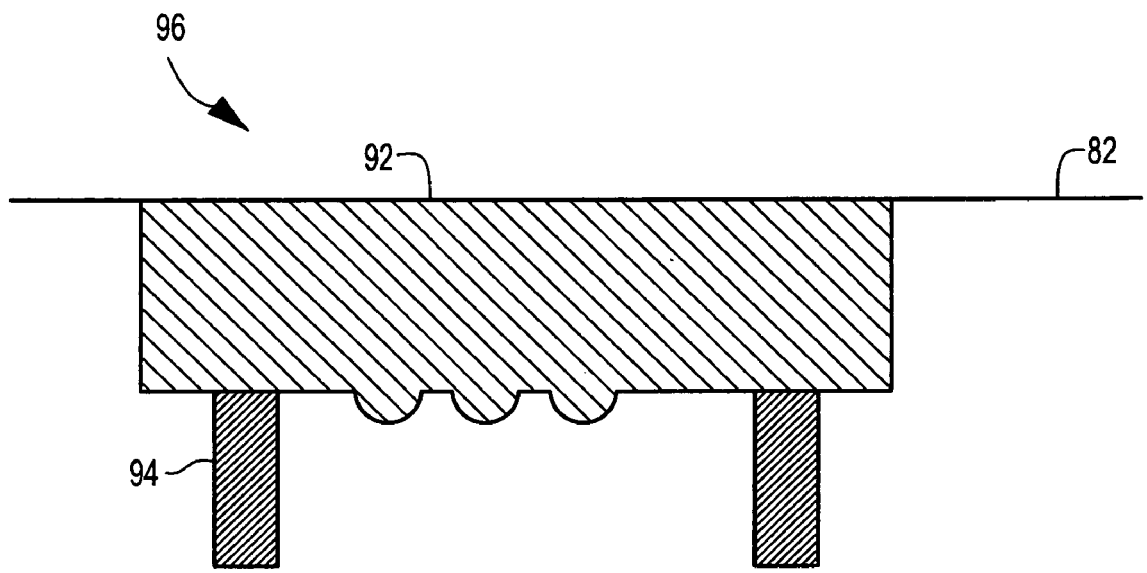
FIG. 10 illustrates the next step in an alternate embodiment, in which the remaining area of the mold insert is filled with an optical material to fabricate a connector with integrated metal guide pins and optical micro lens elements.

FIGS. 8 and 9 illustrate an alternate molding procedure using a molding apparatus 80 comprised of first and second pieces 82 and 84. Mold piece 82 defines a recess 86 to receive the second mold piece 84, and a set of cavities 88 to form the micro lenses. When the mold apparatus 80 is closed, as shown in FIG. 8, the mold pieces 82 and 84 combine to form a set of cavities 90 for forming metallic pins. In use, a suitable material is deposited or injected into cavities 90 to form the metallic pins, mold piece 84 is removed, and a suitable material is deposited or injected into cavities to form micro lenses. With reference to FIG. 10, recess 86 then may be filled with an optical polymer 92, which fills and surrounds pins 94, to form structure 96.

As will be readily apparent to those skilled in the art, aspects of the present invention can be realized in hardware, software, or a combination of hardware and software. Any kind of computer/server system(s)—or other apparatus adapted for carrying out these aspects—is suited. A typical combination of hardware and software could be a general purpose computer system with a computer program that, when loaded and executed, carries out methods described herein. Alternatively, a specific use computer, containing specialized hardware for carrying out one or more of the functional tasks of the invention, could be utilized.

Features of the present invention can also be embodied in a computer program product, which comprises all the respective features enabling the implementation of various features or processes described herein, and which—when loaded in a computer system—is able to carry out these features. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of fabricating a molded structure including both micro lenses and metallic pins, comprising the steps of:
   providing a mold apparatus having a set of first cavities and a set of second cavities;
   depositing a first material in the first cavities to form a set of metallic pins; and
   depositing a second material in the second cavities to form a set of micro lenses.

2. A method according to claim 1, wherein:
   said first material has a higher melting point than said second material; and
   said first material is deposited in the mold apparatus before the second material.

3. A method according to claim 1, comprising the further step of using non-linear scan paths during injection molding to facilitate selective fill of different cavities with different materials.

4. A method according to claim 1, wherein the step of depositing the first material includes the steps of:
   providing a fill mechanism for depositing the first material in the mold apparatus; and
   moving said fill mechanism across the mold apparatus to deposit said first material in the set of first cavities.

5. A method according to claim 4, wherein said moving step includes the step of controlling movement of the fill mechanism, during said moving step, to prevent said fill mechanism from moving over the set of second cavities.

6. A method according to claim 4, comprising the further steps of:
   covering said set of second cavities during said moving step with a removable sacrificial cover to prevent said first material from being deposited in said set of second cavities; and
   removing said sacrificial cover after the step of depositing the first material in the set of first cavities to make way for the second material.

7. A method according to claim 1, comprising the further step of molding an optical polymer to form a substrate of the molded structure, said substrate surrounding portions of the metallic pins and forming a supporting base for the micro lenses.

* * * * *